US006215543B1

(12) United States Patent
Mason et al.

(10) Patent No.: US 6,215,543 B1
(45) Date of Patent: *Apr. 10, 2001

(54) FERROELECTRIC LIQUID CRYSTAL DEVICE COMPRISING A POLYMER AND EXHIBITING A MINIMUM IN A RESPONSE TIME VERSES VOLTAGE CURVE

(75) Inventors: Ian Robert Mason; Damien Gerard McDonnell; John Clifford Jones; Guy Peter Bryan-Brown, all of Malvern (GB)

(73) Assignee: The Secretary of State for Defence in Her Britannic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/516,192

(22) Filed: Mar. 1, 2000

Related U.S. Application Data

(62) Division of application No. 08/793,527, filed on Feb. 27, 1997.

(30) Foreign Application Priority Data

Aug. 31, 1994 (GB) .................................................. 9417480
Aug. 30, 1995 (GB) .................................... PCT/GB95/02036

(51) Int. Cl.⁷ ...................................................... G02F 1/133
(52) U.S. Cl. .......................... 349/183; 349/172; 349/184; 349/88; 349/85; 349/33
(58) Field of Search ................................. 349/183, 184, 349/172, 88, 85, 33

(56) References Cited

U.S. PATENT DOCUMENTS 4,367,924 * 1/1983 Clark et al. ............................. 349/37
4,563,059 * 1/1986 Clark et al. .......................... 349/123

(List continued on next page.)

FOREIGN PATENT DOCUMENTS

0586014A1   8/1993 (EP) .

OTHER PUBLICATIONS

Informacije Midem, Mar. 1993, Slovenia, vol. 23, No. 1, ISSN 0352–9045, pp. 38–42, Pirs J et al, "Ferroelectric liquid crystal–polymer gel displays".

Applied Physics Letters, Feb. 7, 1994, USA., vol. 64, No. 6, ISSN 003–6951, pp. 718–720, XP 000422877 Kyehun Lee et al, "Fast linear electro–optical switching properties of polymer–dispersed ferroelectric liquid crystals."

Ferroelectrics, 1993, UK, vol. 148, No. 1–4, ISSN 0015–0193, pp. 389–399, Lester G et al, "Electro–optic behaviour of low molar mass FELC's doped with liquid cyrstal polymers".

*Primary Examiner*—William L. Sikes
*Assistant Examiner*—Julie Ngo
(74) *Attorney, Agent, or Firm*—Nixon & Vanderhye P.C.

(57) ABSTRACT

In order to reduce the effects of impact on liquid crystal devices a polymer network is introduced into ferroelectric liquid crystal cells. A liquid crystal device comprises two spaced cell walls each bearing electrode structures and treated on at least one facing surface with an alignment layer, a layer of a smectic liquid crystal material enclosed between the cell walls, characterised in that the liquid crystal material contains a small amount of monomer. The liquid crystal material may also contain a photoinitiator. The monomer material may be cured to produce the polymer networks the curing many be carried out in the presence of an electric or magnetic field. Further, the monomer may be cured in an isotropic or liquid crystal phase.

8 Claims, 7 Drawing Sheets

U.S. PATENT DOCUMENTS 5,061,047 * 10/1991 Bradshaw et al. .................... 349/172
5,216,530 * 6/1993 Pearlman et al. ...................... 359/43
5,434,685  7/1995 Pirs et al. ............................... 349/88
6,075,583 * 6/2000 Mason et al. ........................ 349/183

* cited by examiner

FERROELECTRIC LIQUID CRYSTAL DEVICE COMPRISING A POLYMER AND EXHIBITING A MINIMUM IN A RESPONSE TIME VERSES VOLTAGE CURVE

This is a divisional of application Ser. No. 08/793,527, filed Feb. 27, 1997, now pending, the entire content of which is hereby incorporated by reference in this application.

BACKGROUND OF THE INVENTION

1. Field of the Invention

This invention relates to novel ferroelectric liquid crystal devices.

2. Discussion of Prior Art

Liquid crystal materials are widely used in liquid crystal displays such as watches, calculators etc. Most displays of this type consist of a thin film of a liquid crystalline composition sandwiched in a cell between two substrates, at least one of which is transparent and having transparent electrodes on their inner surfaces. On applying a potential difference across the electrodes the alignment of the molecules of the liquid crystalline composition is altered resulting in an electro-optic effect in the material, which is exploited by the display. Most often electro-optic effects in the nematic liquid crystal phase are exploited in such displays. Examples of types of displays include the twisted nematic, the Freedericksz effect device, cholesteric memory mode device, cholesteric to nematic phase change effect device, dynamic scattering effect device, two frequency switching effect device and the 'supertwist' effect device. Other types of device include active matrix twisted nematics, pi-cells and ferroelectric liquid crystal devices.

Ferroelectric smectic liquid crystal materials, which can be produced by mixing an achiral host and a chiral dopant, use the ferroelectric properties of the tilted chiral smectic C, F, G, H, I, J and K phases. The chiral smectic C phase is denoted $S_C^*$ with the asterisk denoting chirality. The $S_C^*$ phase is generally considered to be the most useful as it is the fastest switching. Ferroelectric smectic liquid crystal materials should ideally possess the following characteristics: low viscosity, controllable spontaneous polarisation (Ps) and an $S_C^*$ phase that persists over a broad temperature range, which should include ambient temperature and exhibits chemical and photochemical stability. Materials which possess these characteristics offer the prospect of very fast switching liquid crystal containing devices. Some applications of ferroelectric liquid crystals are described by J. S. Patel and J. W. Goodby in Opt. Eng., 1987, 26, 273.

In ferroelectric liquid crystal devices the molecules switch between different alignment directions depending on the polarity of an applied electric field. These devices can be arranged to exhibit bistability where the molecules tend to remain in one of two states until switched to the other switched state. Such devices are termed surface stabilised ferroelectric devices, e.g. as described in U.S. Pat. No. 5,061,047 and U.S. Pat. No. 4,367,924 and U.S. Pat. No. 4,563,059. This bistability allows the multiplex addressing of quite large and complex devices.

One common multiplex display has display elements. i.e. pixels, arranged in an x, y matrix format for the display of e.g. alpha numeric characters. The matrix format is provided by forming the electrodes on one slide as a series of column electrodes, and the electrodes on the other slide as series of row electrodes. The intersections between each column and row form addressable elements or pixels. Other matrix layouts are known, e.g. seven bar numeric displays.

There are many different multiplex addressing schemes. A common feature involves the application of a voltage, called a strobe voltage to each row or line in sequence. Coincidentally with the strobe applied at each row, appropriate voltages, called data voltages, are applied to all column electrodes. The differences between the different schemes lies in the shape of the strobe and data voltage waveforms.

Other addressing schemes are described in GB-2,146,473-A; GB-2,173,336-A; GB-2,173,337-A; GB-2,173,629-A; WO 89/05025: Harada et al 1985 S.I.D. Paper 8.4 pp 131–134; Lagerwall et al 1985 I.D.R.C. pp 213–221 and P Maltese et al in Proc 1988 I.D.R.C. p 90–101 Fast Addressing for Ferroelectric LC Display Panels.

The material may be switched between its two states by two strobe pulses of opposite sign, in conjunction with a data waveform. Alternatively, a blanking pulse may be used to switch the material into one of its states. Periodically the sign of the blanking and the strobe pulses may be alternated to maintain a net d.c. value.

These blanking pulses are normally greater in amplitude and length of application than the strobe pulses so that the material switches irrespective of which of the two data waveforms is applied to any one intersection. Blanking pulses may be applied on a line by line basis ahead of the strobe, or the whole display may be blanked at one time, or a group of lines may be simultaneously blanked.

It is well known in the field of ferroelectric liquid crystal device technology that, in order to achieve the highest performance from devices, it is important to use mixtures of compounds which give materials possessing the most suitable ferroelectric smectic characteristics for particular types of device.

Devices can be assessed for speed by consideration of the response time vs pulse voltage curve. This relationship may show a minimum in the switching time ($t_{min}$) at a particular applied voltage ($V_{min}$). At voltages higher or lower than $V_{min}$ the switching time is longer than $t_{min}$. It is well understood that devices having such a minimum in their response time vs voltage curve can be multiplex driven at high duty ratio with higher contrast than other ferroelectric liquid crystal devices. It is preferred that the said minimum in the response time vs voltage curve should occur at low applied voltage and at short pulse length respectively to allow the device to be driven using a low voltage source and fast frame address refresh rate.

Typical known materials (where materials are a mixture of compound having suitable liquid crystal characteristics) which do not allow such a minimum when included in a ferroelectric device include the commercially available materials known as SCE13 and ZLI-3654 (both supplied by Merck UK Ltd. Poole, Dorset). A device which does show such a minimum may be constructed according to PCT GB 88/01004 and utilising materials such as e.g. commercially available SCE8 (Merck UK Ltd). Other examples of prior art materials are exemplified by PCT/GB/86/00040, PCT/GB87/00441 and UK 2232416B.

There are problems relating to the mechanical stability of ferroelectric liquid crystal devices. For example if a force is applied to a device. e.g. it is dropped or it is subjected to some sort of impact then the cell may be damaged, usually because the alignment is adversely affected.

SUMMARY OF THE INVENTION

The present invention overcomes the above problems relating to the mechanical stability of ferroelectric liquid crystal cells by the incorporation of a monomer material with a ferroelectric liquid crystal material.

According to this invention a liquid crystal device comprises two spaced cell walls each bearing electrode structures and treated on at least one facing surface with an alignment layer, a layer of a smectic liquid crystal material enclosed between the cell walls, characterised in that the liquid crystal material contains a small amount of monomer.

According to a further aspect of this invention the liquid crystal material may also contain a photoinitiator.

According to a further aspect of this invention the monomer may be cured with or without the presence of a field.

The material may be cured in an isotropic or preferably a liquid crystal phase, for example a $S_C$ phase.

Preferably the monomer is present up to an amount of 10 wt %. more preferably up to 5% and even more preferably the amount of monomer present lies in the range 0.01–2.0%.

Typically the curing involves UV curing or heat curing.

On curing the monomeric material may be partly or fully polymerised.

A further aspect of this invention provides for a method of reducing the susceptibility of ferroelectric liquid crystal cells to impact damage comprising the steps of providing a liquid crystal device comprising two spaced cell walls each bearing electrode structures and treated on at least one facing surface with an alignment layer, a layer of a smectic liquid crystal material enclosed between the cell walls, characterised by the inclusion of a small amount of monomer material.

For this method the ferroelectric liquid crystal cell may be surface stabilised.

A further aspect of this invention provides for an electro-optic device comprising two spaced cell walls each bearing an electrode structure and treated on at least one facing surface with an alignment layer, a layer of a polymer liquid crystal material and ferroelectric liquid crystal material enclosed between the cell walls characterised in that the polymer liquid crystal is prepared by the in-situ polymerisation of a monomer.

The monomer may be a liquid crystal monomer.

BRIEF DESCRIPTION OF THE DRAWING

The invention will now be described by way of example only with reference to the following drawings of which:

Figure 1:
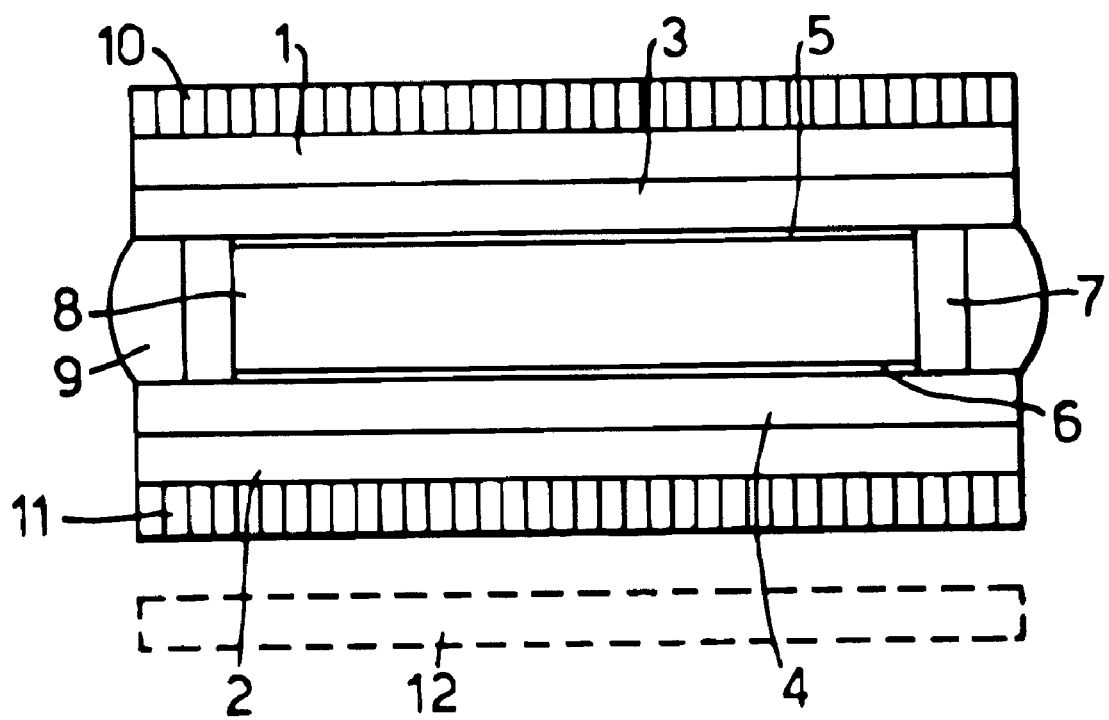
Figure 2A:
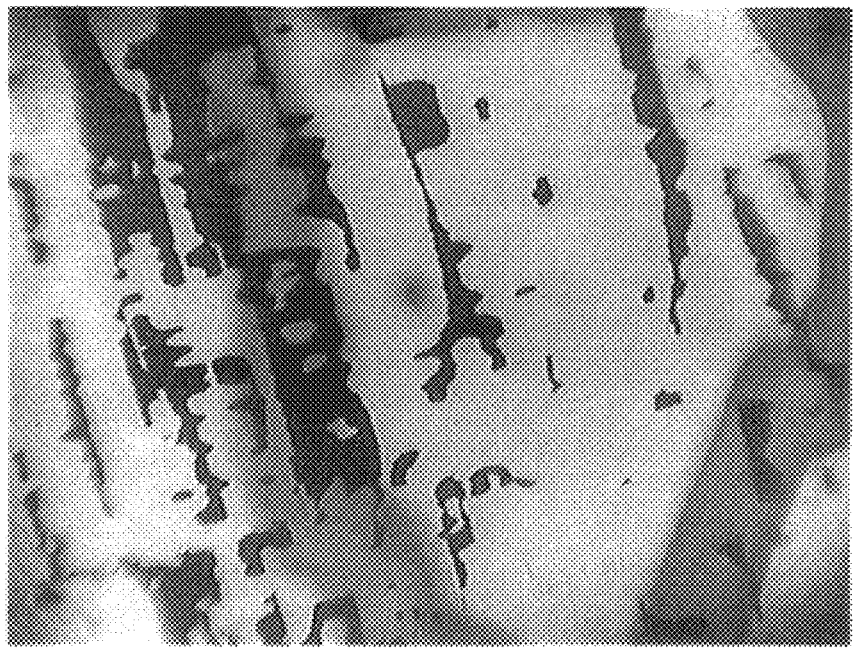
Figure 2B:
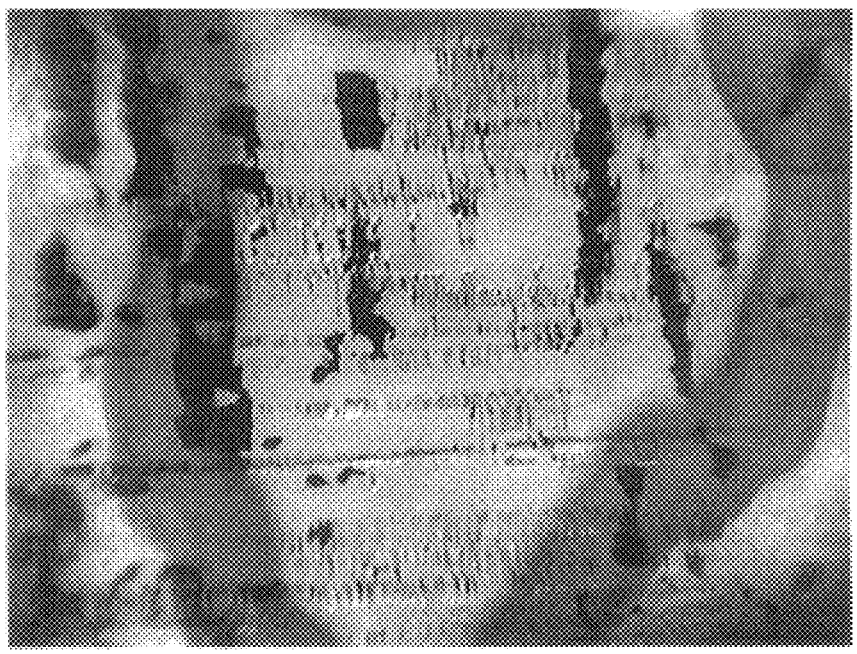
Figure 3A:
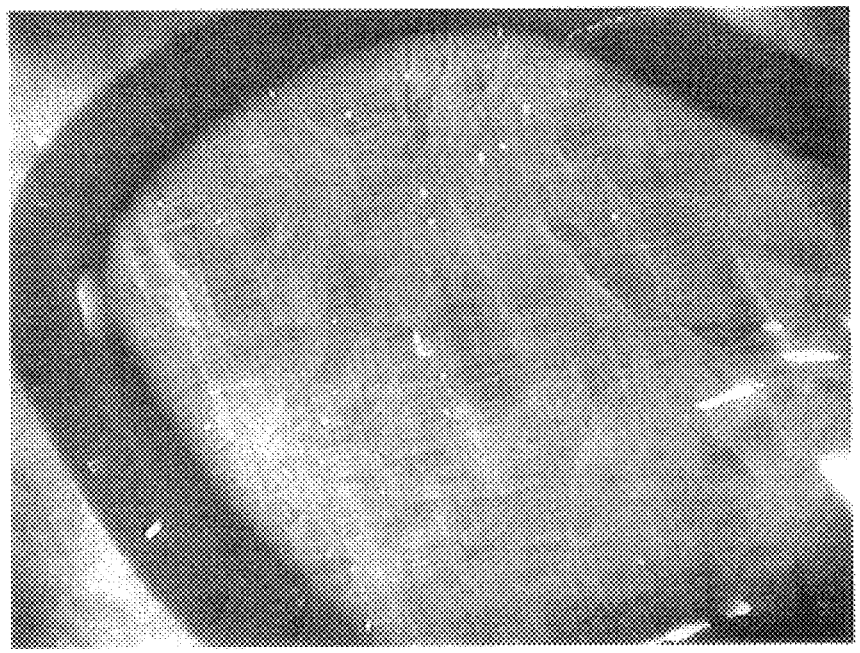
Figure 3B:
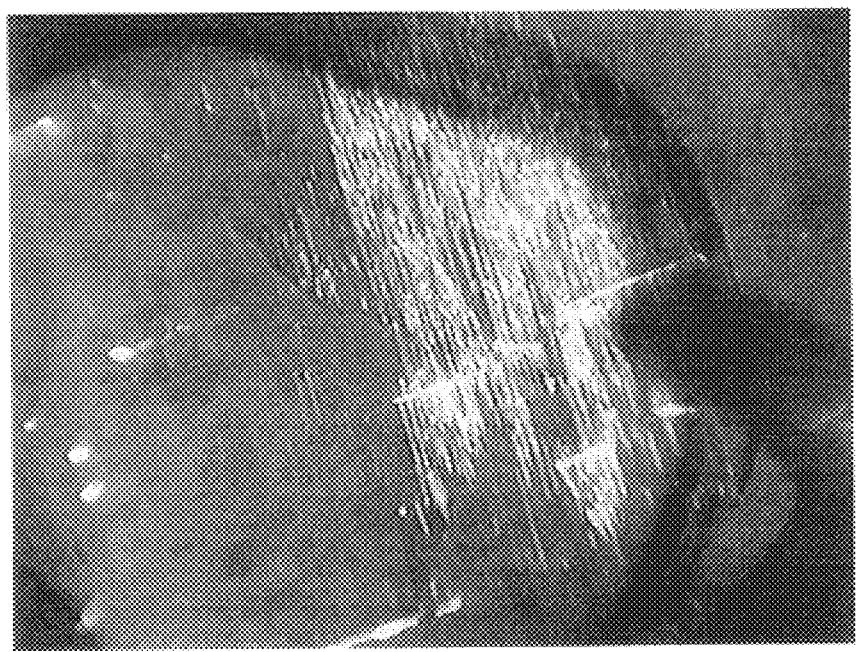
Figure 4A:
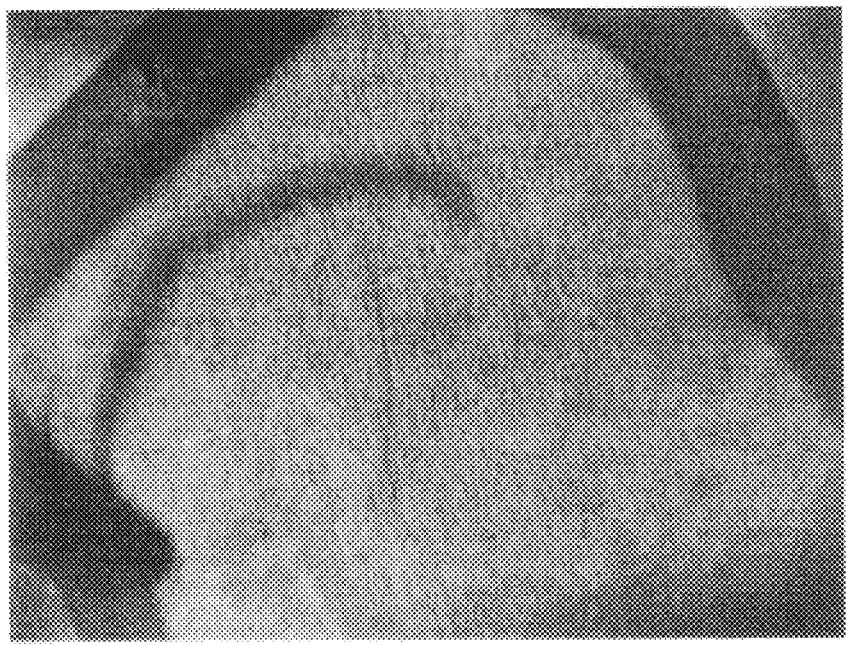
Figure 4B:
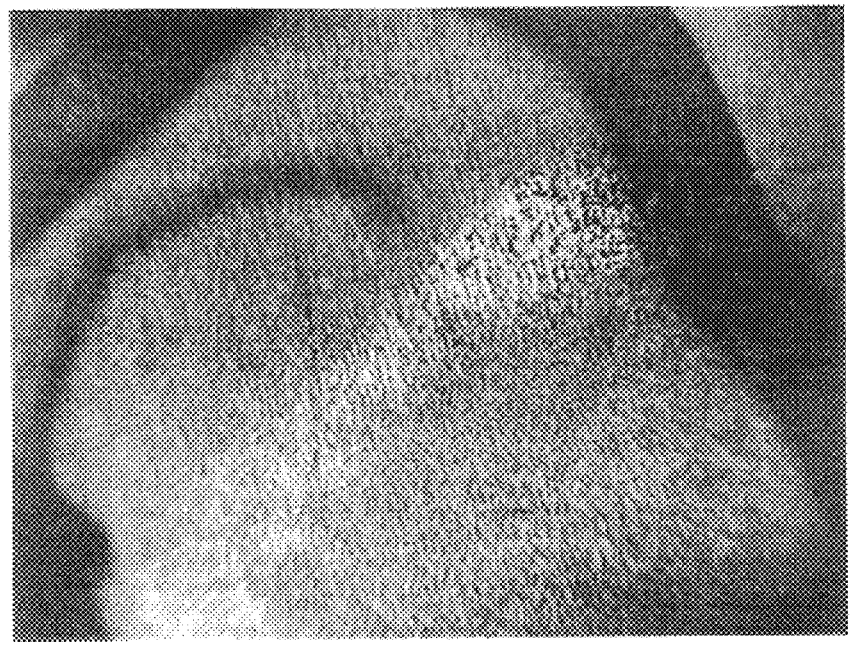
Figure 5A:
Figure 5B:
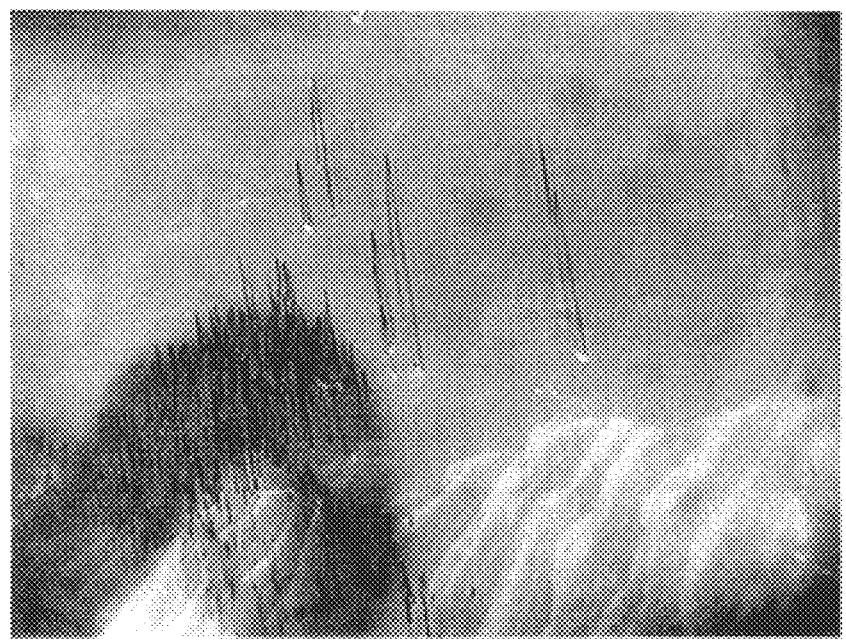
Figure 6A:
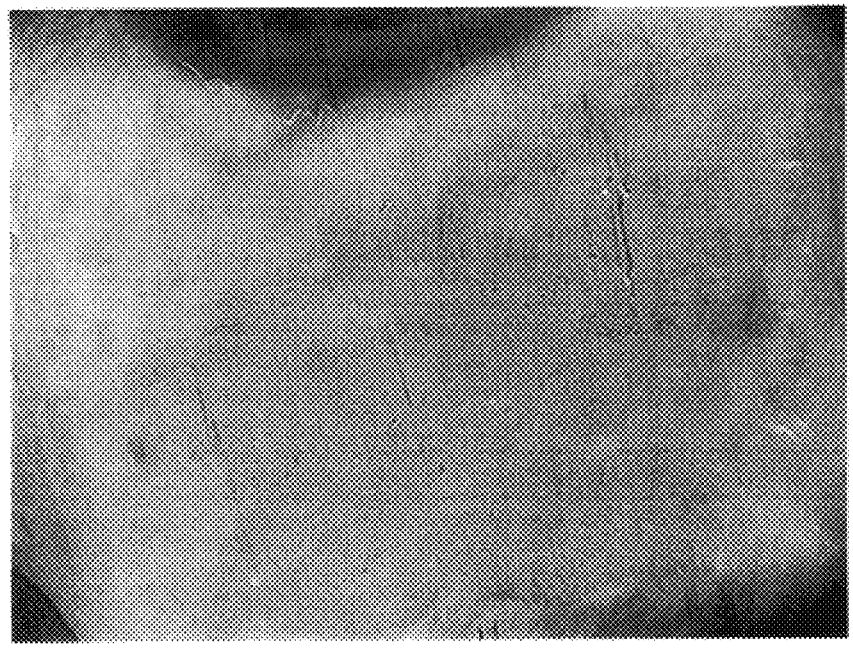
Figure 6B:
Figure 7:
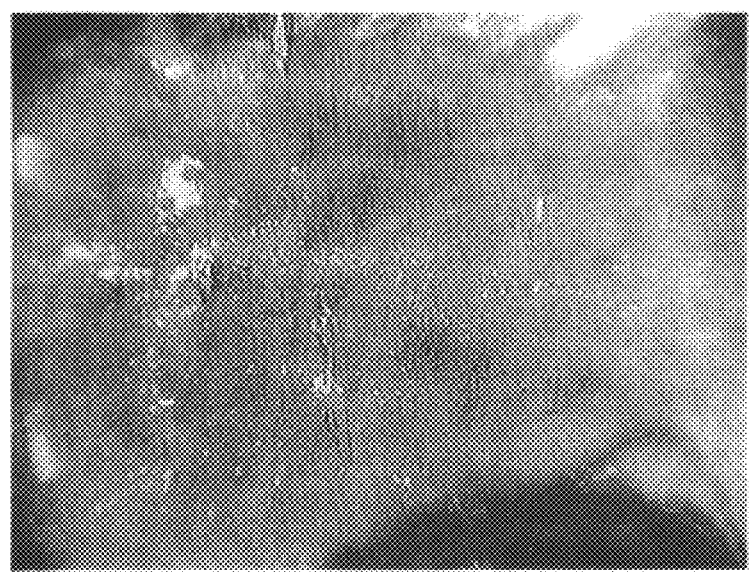
Figure 8:
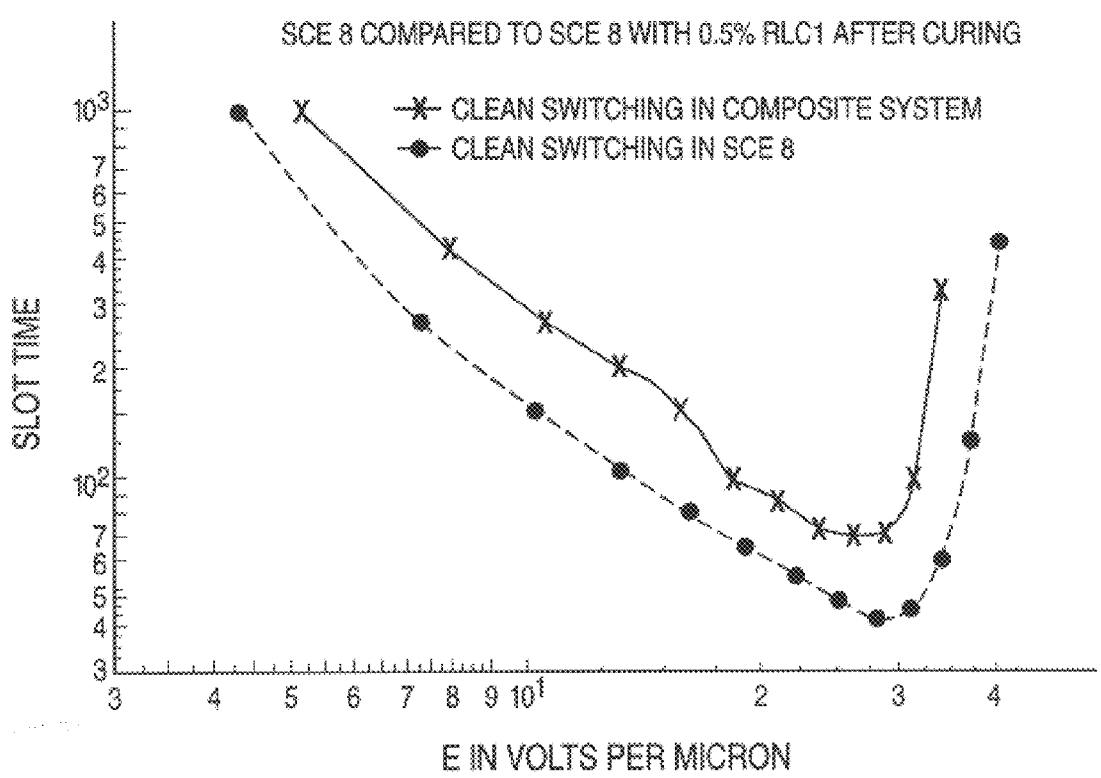

| | |
|---|---|
| FIG. 1 | illustrates a liquid crystal device. |
| FIGS. 2a and 2b | show the before (2a) and after (2b) effects of dropping a ball-bearing from a height of 2 cm onto a liquid crystal cell containing SCE8 only. |
| FIGS. 3a and 3b | show the before (3a) and after (3b) effects of dropping a ball-bearing from a height of 2 cm onto a liquid crystal cell containing SCE8 and 1% of RLC1 before curing. |
| FIGS. 4a and 4b | show the before (4a) and after (4b) effects of dropping a ball-bearing from a height of 4 cm onto a liquid crystal cell containing SCE8 and 1% of RLC1 after curing. |
| FIGS. 5a and 5b | show the before (5a) and after (5b) effects of dropping a ball-bearing from a height of 2 cm onto a liquid crystal cell containing SCE8 and 0.5% of RLC1 before curing. |
| FIGS. 6a and 6b | show the before (6a) and after (6b) effects of dropping a ball-bearing from a height of 2 cm onto a liquid crystal cell containing SCE8 and 0.5% of RLC1 after curing. |
| FIG. 7 | shows the after effect of dropping a ball-bearing from a height of 3 cm onto a liquid crystal cell containing SCE8 and 0.5% of RLC1 after curing. |
| FIG. 8 | illustrates a $V_{min}$, $t_{min}$ graph for a thermally aligned sample of SCE8 + 0.5% RLC1 + approximately 0.1% Darocur 1173 compared to a sample of SCE8. |

DETAILED DISCUSSION OF PREFERRED EMBODIMENTS

The liquid crystal device consists of two transparent plates, 1 and 2, for example made from glass. These plates are coated on their internal face with transparent conducting electrodes 3 and 4. An alignment layer is introduced onto the internal faces of the cell so that a planar orientation of the molecules making up the liquid crystalline material will be approximately parallel to the glass plates 1 and 2. This is done by coating the glass plates 1, 2 complete with conducting electrodes 3, 4 with layers of film 5 and 6 of a suitable polymer, e.g. polyimide. The electrodes 3, 4 may be formed into row and column electrodes so that the intersections between each column and row form an x, y matrix of addressable elements or pixels. Prior to the construction of the cell the films 5, 6 are rubbed with a soft tissue in a given direction, the rubbing directions being arranged parallel (same or opposite direction) upon construction of the cell. A spacer 7 e.g. of polymethyl methacrylate separates the glass plates 1 and 2 to a suitable distance e.g. 2 microns. Liquid crystal material (typically including at least one type of monomer and an initiator) 8 is introduced between glass plates 1, 2 by filling the space in between them. This may be done by flow filling the cell using standard techniques.

The spacer 7 is sealed with an adhesive 9 in a vacuum using an existing technique. Polarisers 10, 11 may be arranged in front of and behind the cell. In order to assist the alignment of the liquid crystal material, various techniques may be used. One of these techniques involves thermally cycling the cell. The material may then be cured with or without the presence of an electric or magnetic field and also with or without the presence of a photoinitiator. Alteratively the liquid crystal material may be maintained at the filling temperature and subsequently cured at that temperature.

The curing of the material may result in a polymer network comprising polymers of varying molecular weight. There may also be present in small amounts unreacted monomer.

The device may operate in a transmissive or reflective mode. In the former, light passing through the device. e.g. from a tungsten bulb, is selectively transmitted or blocked to form the desired display. In the reflective mode a mirror (12) is placed behind the second polariser 11 to reflect ambient light back through the cell and two polarisers. By making the mirror partly reflecting, the device may be operated both in a transmissive and reflective mode.

In an alternative embodiment a single polariser and dye material may be combined.

A number of tests were carried out to assess the resistance of the device to mechanical shock. In order to test for mechanical shock a hollowed tube was suspended vertically over a liquid crystal cell. At regular intervals holes were cut into the tube so that a rod could be inserted horizontally into the tube. A steel ball-bearing, weighing 1.04 g, was then inserted into the top end of the tube so that it came to rest on the horizontal rod. The rod could then be removed and the ball-bearing allowed to drop onto the liquid crystal cell. The energy of impact of the ball-bearing on the liquid crystal cell could then be estimated.

Having carried out tests of the above type it was then possible to assess the nature of the damage inflicted by visual inspection and by assessing some of the switching characteristics of the liquid crystal cell.

One of the monomers tested was the commercially available (MERCK, UK) RLC1. This has the following formula:

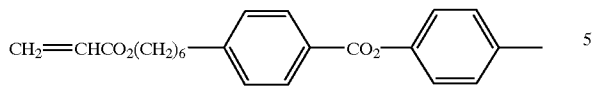

Any ferroelectric mixture is suitable to be used in a device described by the current invention. Some examples are commercially available (Merck. UK) SCE8 and SCE13.

Any monomer is suitable to be used in a device described by the invention.

Examples of suitable photoinitiators include Darocurs and Igacurs available from Merck UK such as Darocur 1173 or 4265 and Igacur 651. There are various UV curables which are available, some examples are Electrolite corporation materials such as ELC 4481 available through Intertronics Ltd. Kidlington, Oxon.

EXAMPLE 1

SCE13+5% RLC1−approximately 0.1% Darocur 1173.

EXAMPLE 2

SCE8+1% RLC1+approximately 0.1% Darocur 1173.

EXAMPLE 3

SCE8+0.5% RLC1+approximately 0.1% Darocur 1173. Thermally aligned.

$t_{min}$ against $V_{min}$ plots were run for example 3.

For example 3, one cell was cured a/ in the presence of a d.c. field and another cell b/ was cured without the field. It was only for the cell cured without the presence of a field (3b) that electro-optic switching studies for example $t_{min}$, $V_{min}$ studies could be carried out on.

FIGS. 2–7 illustrate the appearance of liquid crystal cells viewed under a microscope before and after they had been subjected to mechanical shock. Typically cells were 1.5–2.0 μm thick for these experiments, though cells of any suitable thickness could have been used.

For the examples contained in FIGS. 2–7, all of those that were cured were flow filled, thermally cycled and cured in the $S_C$ phase under a UV lamp with no field applied. The initiator used was Darocur 1173 (approximately 0.1%).

Examples were also tested wherein the materials were cured in the isotropic state after flow filling in the isotropic state.

What is claimed is:

1. A liquid crystal device comprising:

two spaced cell walls, each cell wall bearing electrode structures and treated on at least one facing surface with an alignment layer; and a layer of a smectic liquid crystal material enclosed between the cell walls wherein the liquid crystal material includes an amount of monomer which is subsequently at least partly polymerized into a polymer and said device exhibits a minimum in a response time verses voltage curve, wherein said amount of monomer lies in the range of up to 5.0 wt. %.

2. A liquid crystal device according to claim 1 wherein the monomer is a liquid crystal monomer.

3. A liquid crystal device according to claim 1 wherein the polymer is prepared by the in-situ polymerization of said monomer.

4. A liquid crystal device according to claim 1 wherein the polymer is present as a network.

5. A method of reducing the susceptibility of ferroelectric liquid crystal cells to impact damage, said method comprising the steps of:

providing a liquid crystal device comprising two spaced cell walls, each wall bearing electrode structures and treated on at least one facing surface with an alignment layer;

providing a layer of a smectic liquid crystal material enclosed between the cell walls, wherein the liquid crystal material includes an amount of monomer which is subsequently at least partly polymerized into a polymer and said device exhibits a minimum in a response time verses voltage curve, wherein said amount of monomer lies in the range of up to 5.0 wt. %.

6. A method according to claim 5 wherein the ferroelectric liquid crystal cell is surface stabilized.

7. A device according to claim 5 wherein the polymer is a liquid crystal polymer.

8. A method of reducing the susceptibility of ferroelectric liquid crystal cells to impact damage, said method comprising the steps of:

providing a liquid crystal device comprising two spaced cell walls, each wall bearing electrode structures and treated on at least one facing surface with an alignment layer;

providing a layer comprising an amount of polymer liquid crystal material and ferroelectric liquid crystal material, said layer enclosed between the cell walls wherein the polymer liquid crystal material is prepared by the in-situ polymerization of a monomer material and said device exhibits a minimum in a response time verses voltage curve, wherein said polymer is a cured monomer and the amount of monomer lies in the range of up to 5.0 wt. %.

* * * * *